Nov. 15, 1966 P. AGERON 3,285,824
SWIMMING-POOL REACTOR
Filed March 3, 1964 4 Sheets-Sheet 3

United States Patent Office 3,285,824
Patented Nov. 15, 1966

3,285,824
SWIMMING-POOL REACTOR
Paul Ageron, Grenoble, France, assignor to Commissariat a l'Energie Atomique, Paris, France
Filed Mar. 3, 1964, Ser. No. 348,966
Claims priority, application France, Mar. 16, 1963, 928,241
3 Claims. (Cl. 176—62)

The present invention relates to a swimming-pool reactor, that is to say a nuclear reactor wherein the fuel elements which are grouped together so as to form the reactor core are immersed in a tank filled with water, or "pool". The water plays the part of neutron moderator as well as a heat-transporting fluid for the purpose of cooling the fuel elements and biological shield elements.

The possibility which is offered to research personnel of working from the free surface of the pool provides substantial advantages over pressurized reactors, for example.

The invention is more especially concerned with swimming-pool reactors of the type comprising a partition wall which separates the body of water into a bottom compartment containing the core and a top compartment, a first circulation system comprising means for withdrawing a flow of water from the bottom compartment so as to cause the greater part of said flow to pass through a heat exchanger in order to be cooled in said exchanger and then returned into said bottom compartment, and a second circulation system comprising means for deactivating the other part of the flow and returning said other part into the top compartment.

It is known that this arrangement is highly advantageous inasmuch as it permits the possibility of maintaining at the pool surface water which is relatively decontaminated and which, by reason of its temperature, has no tendency to be replaced by fresh water which has not been purified.

When seeking to obtain a high neutron flux, it is advisible to devote continued attention to the corresponding increase in the activity of the water at the pool surface, especially when such activity is liable to cause a hindrance to research workers when carrying out experiments within the core from the free surface of the pool.

One solution which has been proposed and which makes it possible to retain a relatively low level of activity at the pool surface whilst the reactor power increases consists in dividing the water tank into two compartments by means of a group of removable horizontal baffles. The bottom compartment contains the reactor core and the depth thereof is just sufficient to provide biological shielding for the operating personnel. Above the baffles, a layer of water is maintained at a low level of activity.

This arrangement has the disadvantage of making the operation of the baffles an essential condition in order to gain access to the fuel elements. In addition, it is necessary to make provision in the baffles for appropriate openings providing passageways for experimental devices which project from the core.

The main object of the invention is to overcome the above-mentioned disadvantages and to permit of an increase in the neutron flux level of swimming-pool reactors while retaining the flexibility and safety of operation which are appreciated by research workers in this type of reactor.

The invention consists of a nuclear reactor of the swimming pool type comprising a body of water which is separated by a partition wall into a bottom compartment containing the core and a top compartment, a first circulation system comprising means for withdrawing a flow of water from the bottom compartment so as to cause the greater part of said flow to pass through a heat exchanger in order to be cooled in said exchanger and then returned into said bottom compartment, and a second circulation system comprising means for deactivating the other part of the flow and returning said other part into the top compartment, characterized in that the partition wall is provided vertically above the fuel assemblies with sealing members for closing off an integral number of openings providing passageways for the fuel assemblies which is a fraction of the total number of said fuel assemblies, leakages through the barrier which is formed by said sealing members being compensated by the relatively decontaminated flow of water which is returned into the top compartment.

In accordance with a preferred form of embodiment of the invention, each sealing member is maintained by a structure which surmounts a fuel assembly. The combined unit which consists of the fuel assembly, the connecting structure and the sealing member constitutes an interchangeable unit which can be placed at any location of the support grid which is reserved for a fuel assembly. Furthermore, the devices which project from the reactor core are preferably chosen so as to have dimensions such that said devices are also interchangeable with the fuel assemblies and are provided with an annular flange which forms a sealing element.

In an advantageous alternative form, the circulation of fluid within the fuel assemblies takes place in the upward direction.

Other particular features and alternative forms of the invention will be brought out in the description which follows below, reference being made to FIGS. 1 to 4 which are given solely by way of example and not in any sense by way of limitation.

Figure 1:
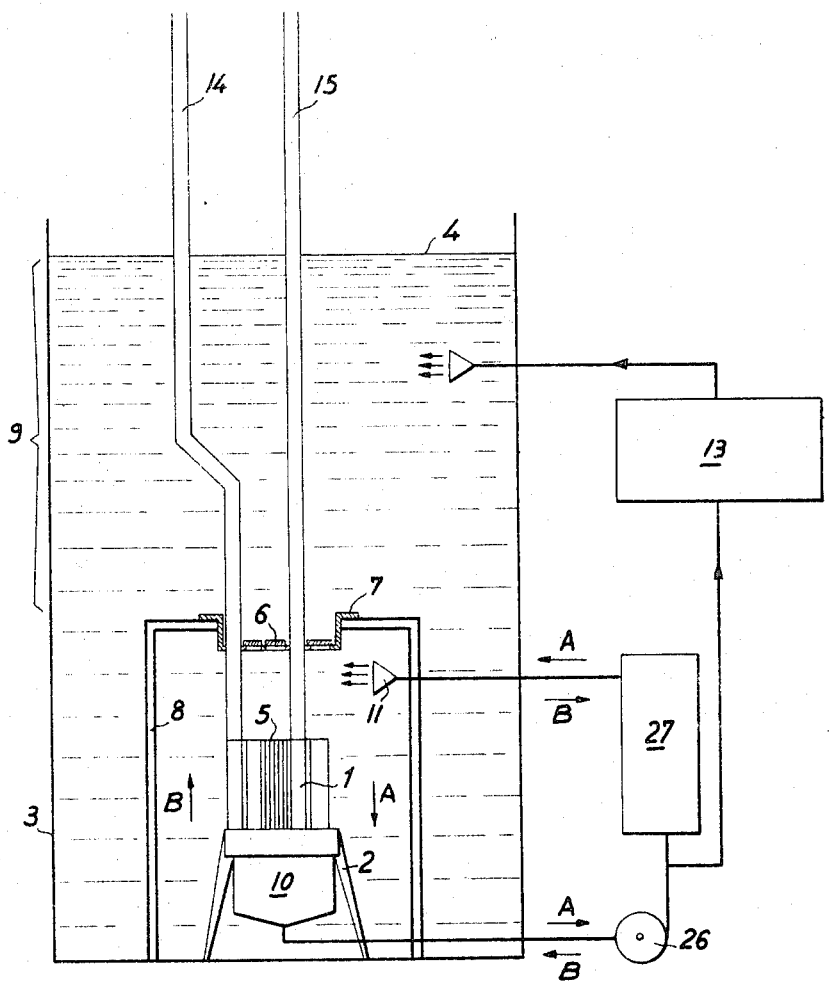
FIG. 1 represents a general arrangement diagram of a swimming-pool reactor in accordance with the invention.

In FIG. 1, the reactor core 1 is placed on a stool at the bottom of the water tank 3 which is filled up to the level 4. In accordance with the invention, a cover 6 is disposed above each location which is provided in the support grid for the purpose of accommodating a fuel assembly 5. Said cover 6 is supported by any suitable means, for example by a grid 7. The covers are all identical. Each cover seals off an opening through which a fuel assembly can be introduced within the reactor core in the location which is provided for said assembly vertically beneath the cover. It will be readily apparent that an element having a geometry which is similar to the geometry of a fuel element can be introduced in the same manner and without any difficulty as soon as the cover has been removed.

When all the covers 6 are in position, said covers constitute a barrier in the line of extension of the stationary partition wall 8 which can also serve as a support for the grid 7. The partition wall 8 and the barrier form a separation between a bottom compartment containing the reactor core 1 and a top compartment containing a layer 9 of water having a relatively substantial depth. During operation, when the covers are in position, relatively hot and activated water is withdrawn from the core compartment through a collector 10. The greater part of the activated water is delivered by the pump 26 into the heat exchanger 27 and is cooled therein before being reinjected into the core compartment through a diffuser 11.

In the case of a downward circulation through the fuel assemblies, the arrows A indicate the direction of flow of the water of the primary circuit. The arrows B indicate the direction of flow in the case of an upward coolant flow, the diffuser and collector being of course reversed.

The remainder of the water of the primary circuit is processed by the purifying means 13 and is preferably withdrawn upstream of the heat exchanger 27, while the clean and relatively hot water is reinjected by said purifying means at the pool surface.

According to the invention, and in combination with the barrier which is formed by the covers, a slightly reduced pressure is maintained on the underface of the barrier by means of the pumps 26, so that any leakage which takes place at the level of the covers is always directed from the layer 9 towards the core compartment. It should be noted that said leakage is compensated by the supply of clean water which is derived from the purifying means 13.

This arrangement and the standardization of the openings which are sealed off by means of the covers 6 make it very easy to perform any operation on the core elements from the free surface of the pool without thereby increasing to an appreciable extent during normal operation the proportion of activated water which is present within layer 9.

It will be apparent that the location which is provided within the reactor core 1 for each fuel assembly can also accommodate an element having a geometry which is similar to this latter. Such an element can also extend outside the core in any form which may be necessary. It is merely necessary to ensure that the cover 6, as removed for this purpose, is replaced by an equivalent sealing member. By way of example, FIG. 1 shows an experimental device 14 which passes out of the water tank and a control rod device 15 which penetrates within the core. A number of covers could be removed if necessary for the purpose of leaving a sufficient clearance for an experiment which takes up a substantial amount of space.

According to a form of embodiment which is particularly useful for the practical application of the invention, it has been found advantageous to combine the fuel assembly and the cover in a single interchangeable unit. One example of embodiment of such a unit has been illustrated in FIG. 2. The portion 16 is a conventional fuel assembly comprising a foot 17 which is adapted to fit inside the reactor core support grid and an assembly of fuel plates 18 which is enclosed within a box 19. Said box has an upward extension in the form of an openwork metallic structure which supports the cover 21, said cover being in turn surmounted by a handle 22. In the case of the figure, the cover 21 has a square cross-section which is identical with that of the fuel assembly. It will be understood that a large number of alternative forms are possible.

If the units are arranged side by side by fitting them within recesses formed in the support grid 7, the covers 21 form the practically continuous barrier which has been mentioned above. The water for cooling the fuel assemblies either flows in or flows out without any substantial pressure drop through the openwork structures 20. In order to remove a fuel assembly, it is merely necessary to grab the handle of said fuel assembly and withdraw this latter in a vertical movement of translation.

Figure 2:
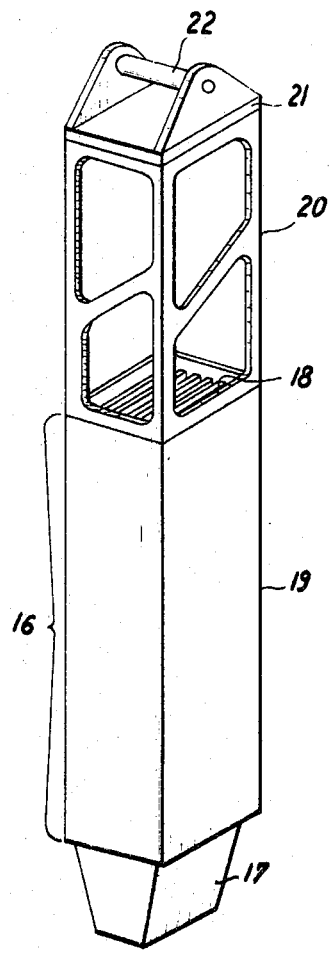
FIG. 2 is a general arrangement diagram of an embodiment with integrated cover and fuel assembly.
Figure 3:
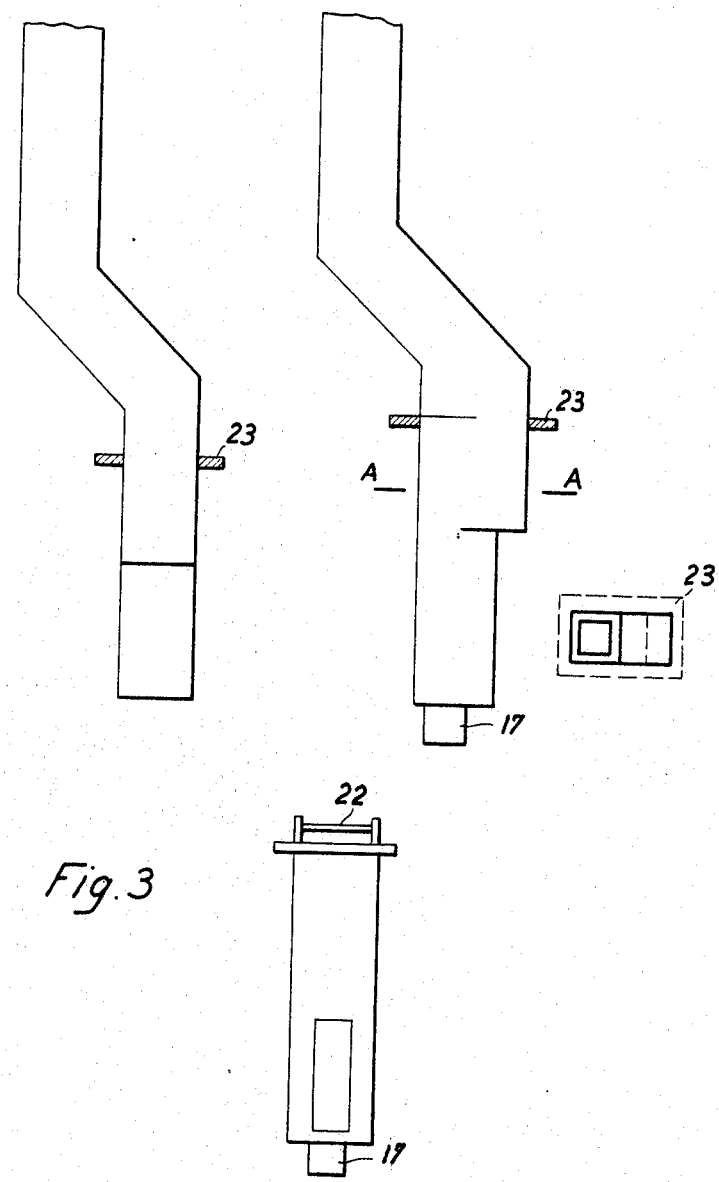
FIG. 3 shows possible geometries of experimental devices.

In accordance with the invention, each experimental device terminates in an element which, in that portion which is to be introduced within the reactor core, has a geometry approximately similar to that of the unit which is illusrtated in FIG. 2. FIG. 3 shows a few examples of shapes which are given to the experimental devices. In the case of devices which are supported from the top, it is not essential to make provision for the centering of the foot. The diagram which is shown on the left-hand side of the figure corresponds to this case. The annular flange 23 performs the same function as the cover 21 of a fuel unit. The center diagram represents an example wherein a connection with the pool surface is not necessary. Finally, there has been shown on the right-hand side an embodiment in which the annular flange 23 seals off the opening which corresponds to two adjacent covers 21, the centering being effected, for example, by means of a single foot 17. A large number of alternative forms are evidently possible without departing from the scope of this novel arrangement.

In accordance with the invention, a slightly reduced pressure is maintained on the underface of the barrier of covers. In the case of a downward circulation of coolant within the fuel assemblies, it is necessary to create a relatively substantial reduced pressure at the base of these latter: the dangers of appearance of ebullition and cavitation phenomena in the case of high-flux operation are not negligible. In view of the effectiveness of the barrier of covers in preventing the activation of the upper layer of water, a downward circulation of coolant through the fuel assemblies can be adopted, the coolant water thus arriving under pressure at the feet of said fuel assemblies. A slightly reduced pressure is nevertheless maintained beneath the barrier.

Figure 4:
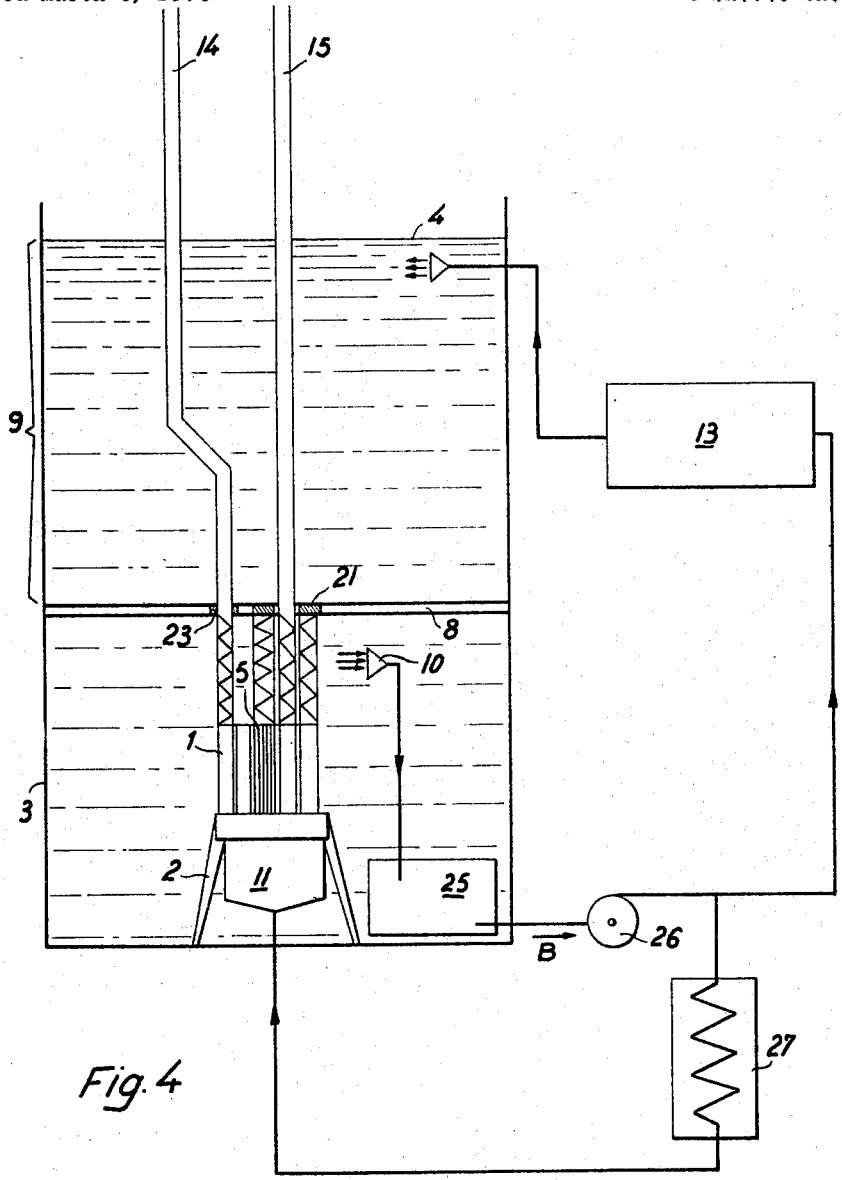
FIG. 4 illustrates a particularly advantageous arrangement of a reactor in accordance with the invention.

FIG. 4 illustrates an arrangement wherein the bottom compartment is limited by a horizontal partition wall 8. This geometry of the core compartment is more favorable to cooling by natural convection in the event of failure of the primary circuit. The diffuser 11 is placed beneath the core, the collector 10 is placed at the top portion of the core compartment. The water from the collector preferably flows into a deactivation tank 25 which is contained in the pool tank. The water is recirculated by the pump 26 and cooled within the heat exchanger 27. The pump 26 delivers at a pressure which is sufficient to compensate the pressure drop within the fuel assemblies. The purification circuit 13 is branched on the downstream side of the pump, and withdraws a part of the relatively active hot water so as to reintroduce this latter at the pool surface in the decontaminated state, but still relatively hot. In this manner, a "hot layer" effect is created within the top compartment of the pool tank.

The invention is not limited to the examples of embodiment which have been described but is intended to include within its scope all alternative forms which are within the capacity of anyone versed in the art. The invention is also concerned, by way of novel industrial products, with fuel units having integrated covers, with the corresponding experimental devices and with the reactors in which these elements are employed.

What I claim is:

1. A swimming-pool reactor comprising a body of water, a reactor core in a bottom portion of said body of water, a plurality of vertically removable fuel assemblies located in parallel relationship in said core, a horizontal partition wall separating said bottom portion from a top portion of said body of water, said partition wall comprising a plurality of individually removable members, each of said members being associated with at least one of said fuel assemblies and providing when removed a passage for said fuel assembly through said partition wall, means for withdrawing a flow of water from said bottom portion, means connected to said withdrawing means for cooling the greater part of said flow, means connected to said cooling means for returning said greater part of said flow into said bottom portion and means connected to said withdrawing means for directing the remainder of said flow into said top portion whereby water leakages through said partition wall are compensated by said remainder of said flow.

2. A nuclear reactor as described in claim 1, a plurality of said removable members being supported on and forming interchangeable units with said fuel assemblies.

3. A reactor as described in claim 1, each of said removable members including devices which project from said reactor core through said wall and at the level of said wall including one of said members.

References Cited by the Examiner

UNITED STATES PATENTS

| | | | |
|---|---|---|---|
| 2,806,819 | 9/1957 | Christy et al. | 176—44 |
| 2,992,176 | 7/1961 | Schoessow | 176—62 |
| 3,029,198 | 4/1962 | Anderson et al. | 176—78 |
| 3,042,601 | 7/1962 | Loeb | 176—62 |
| 3,141,828 | 7/1964 | Steinert et al. | 176—62 |

FOREIGN PATENTS 1,224,251   2/1960   France.

References Cited by the Applicant

Article by G. Halbronn et al., "Echanges Thermiques—Installations de Refrigeration," "Bulletin d'Informations Scientifiques & Techniques," No. 35, December 1959, pages 61–70.

Article by J. Pelser et al., "Description of the Dutch Materials Testing and Research Reactor," "Atoomenergie," Vol. 4, No. 11, November 1962, pages 231–241.

L. DEWAYNE RUTLEDGE, *Primary Examiner.*